(12) United States Patent
Shetty et al.

(10) Patent No.: US 11,392,618 B2
(45) Date of Patent: *Jul. 19, 2022

(54) NON-DISRUPTIVE BASELINE AND RESYNCHRONIZATION OF A SYNCHRONOUS REPLICATION RELATIONSHIP

(71) Applicant: NetApp Inc., Sunnyvale, CA (US)

(72) Inventors: Rithin Kumar Shetty, Sunnyvale, CA (US); Andrew Eric Dunn, Sunnyvale, CA (US); Yi Yang, San Jose, CA (US)

(73) Assignee: NetApp Inc., San Jose, CA (US)

( * ) Notice: Subject to any disclaimer, the term of this patent is extended or adjusted under 35 U.S.C. 154(b) by 441 days.

This patent is subject to a terminal disclaimer.

(21) Appl. No.: 16/504,430

(22) Filed: Jul. 8, 2019

(65) Prior Publication Data

US 2019/0332609 A1 Oct. 31, 2019

Related U.S. Application Data

(63) Continuation of application No. 16/029,755, filed on Jul. 9, 2018, now Pat. No. 10,353,921, which is a continuation of application No. 14/953,070, filed on Nov. 27, 2015, now Pat. No. 10,019,502.

(51) Int. Cl.
| | |
|---|---|
| *G06F 16/00* | (2019.01) |
| *G06F 16/27* | (2019.01) |
| *G06F 16/21* | (2019.01) |
| *G06F 3/06* | (2006.01) |
| *G06F 11/14* | (2006.01) |
| *H04L 67/1095* | (2022.01) |

(52) U.S. Cl.
CPC ............ *G06F 16/275* (2019.01); *G06F 3/065* (2013.01); *G06F 3/067* (2013.01); *G06F 3/0617* (2013.01); *G06F 11/1451* (2013.01); *G06F 16/214* (2019.01); *G06F 16/273* (2019.01); *H04L 67/1095* (2013.01); *G06F 2201/84* (2013.01)

(58) Field of Classification Search
CPC ..... G06F 16/275; G06F 16/273; G06F 16/214
USPC .................................................. 707/611, 639
See application file for complete search history.

(56) References Cited

U.S. PATENT DOCUMENTS

| | | | |
|---|---|---|---|
| 2004/0267836 A1* | 12/2004 | Armangau | G06F 11/1435 707/999.203 |
| 2010/0153338 A1* | 6/2010 | Ngo | G06F 3/0653 707/610 |
| 2015/0066858 A1* | 3/2015 | Sabdar | G06F 16/128 707/639 |

* cited by examiner

*Primary Examiner* — Chelcie L Daye
(74) *Attorney, Agent, or Firm* — Cooper Legal Group, LLC

(57) ABSTRACT

One or more techniques and/or computing devices are provided for non-disruptively establishing a synchronous replication relationship between a primary volume and a secondary volume and/or for resynchronizing the primary volume and the secondary volume. For example, a baseline snapshot and one or more incremental snapshots of the primary volume are used to construct and incrementally update the secondary volume with data from the primary volume. A dirty region log is used to track modifications to the primary volume. A splitter object is used to split client write requests to the primary volume and to the secondary volume. A synchronous transfer engine session is initiated to processing incoming client write requests using the dirty region log. A cutover scanner is used to transfer dirty data from the primary volume to the secondary volume. In this way, a synchronous replication relationship is established between the primary volume and the secondary volume.

20 Claims, 12 Drawing Sheets

NON-DISRUPTIVE BASELINE AND RESYNCHRONIZATION OF A SYNCHRONOUS REPLICATION RELATIONSHIP

RELATED APPLICATIONS

This application claims priority to and is a continuation of U.S. application Ser. No. 16/029,755, filed on Jul. 9, 2018, now allowed, titled "NON-DISRUPTIVE BASELINE AND RESYNCHRONIZATION OF A SYNCHRONOUS REPLICATION RELATIONSHIP," which claims priority to and is a continuation of U.S. Pat. No. 10,019,502, filed on Nov. 27, 2015, titled "NON-DISRUPTIVE BASELINE AND RESYNCHRONIZATION OF A SYNCHRONOUS REPLICATION RELATIONSHIP," which are incorporated herein by reference.

BACKGROUND

Many storage networks may implement data replication and/or other redundancy data access techniques for data loss protection and non-disruptive client access. For example, a first storage cluster may comprise a first storage controller configured to provide clients with primary access to data stored within a first storage device and/or other storage devices. A second storage cluster may comprise a second storage controller configured to provide clients with primary access to data stored within a second storage device and/or other storage devices. The first storage controller and the second storage controller may be configured according to a disaster recovery relationship, such that the second storage controller may provide failover access to replicated data that was replicated from the first storage device to a secondary storage device, owned by the first storage controller, but accessible to the second storage controller (e.g., a switchover operation may be performed where the second storage controller assumes ownership of the secondary storage device and/or other storage devices previously owned by the first storage controller so that the second storage controller may provide clients with failover access to replicated data within such storage devices).

In an example, the second storage cluster may be located at a remote site to the first storage cluster (e.g., storage clusters may be located in different buildings, cities, thousands of kilometers from one another, etc.). Thus, if a disaster occurs at a site of a storage cluster, then a surviving storage cluster may remain unaffected by the disaster (e.g., a power outage of a building hosting the first storage cluster may not affect a second building hosting the second storage cluster in a different city).

In an example, two storage controllers within a storage cluster may be configured according to a high availability configuration, such as where the two storage controllers are locally connected to one another and/or to the same storage devices. In this way, when a storage controller fails, then a high availability partner storage controller can quickly take-over for the failed storage controller due to the local connectivity. Thus, the high availability partner storage controller may provide clients with access to data previously accessible through the failed storage controller.

Various replication and synchronization techniques may be used to replicate data (e.g., client data), configuration data (e.g., a size of a volume, a name of a volume, etc.), and/or write caching data (e.g., cached write operations) between storage controllers and/or storage devices. In an example, snapshots of a primary volume (e.g., within the first storage device) may be used to replicate the primary volume to a secondary volume (e.g., within the secondary storage device). For example, a base snapshot of the primary volume may be used to initially create the secondary volume. A current incremental snapshot of the primary volume may be used to replicate changes made to the primary volume since the base snapshot or since a last incremental snapshot. Unfortunately, synchronizing and/or resynchronizing the primary volume and the secondary volume can be disruptive to client access to the primary volume. For example, client write requests to the primary volume may be rejected during a cutover phase of synchronization, thus increasing latency and client data access disruption.

DETAILED DESCRIPTION

Figure 1:
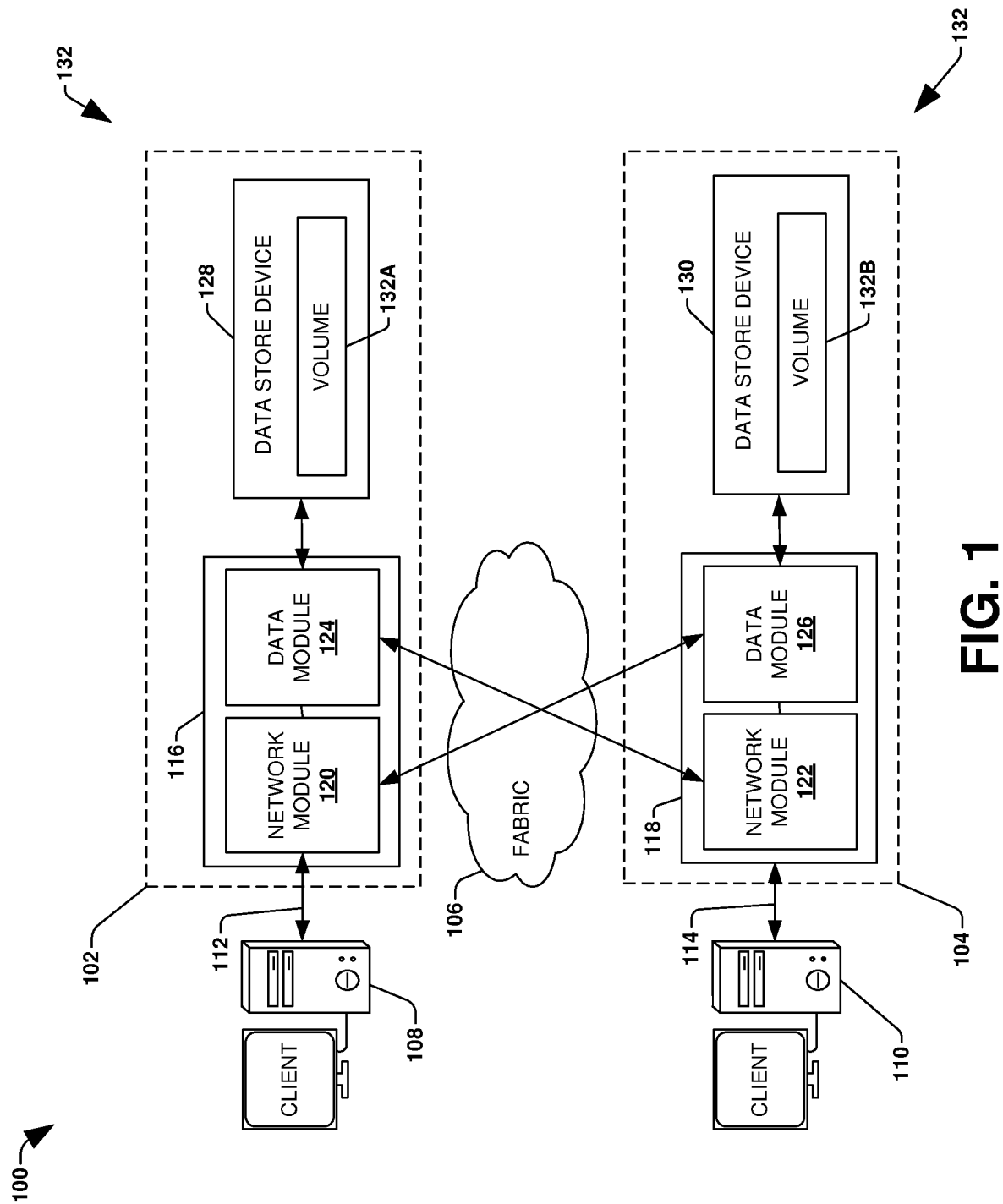
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for non-disruptively establishing a synchronous replication relationship between a primary volume and a secondary volume and/or for resynchronizing the primary volume and the secondary volume are provided herein. For example, a synchronous replication relationship may be initially established between the primary volume (e.g., used to actively store client data for access) and the secondary volume (e.g., used as a backup to store replicated client data from the primary volume) in a non-disruptive manner with little to no client data access disruption to the primary volume. If the primary volume and the secondary volume become out of sync over time (e.g., due to a network issue, a storage controller failure, etc.), then the primary volume and the secondary volume may be resynchronized in a non-disruptive manner.

To provide context for non-disruptively establishing and/or resynchronizing a synchronous replication relationship, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and data modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device 130 by sending a request through the data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that non-disruptively establishing and/or resynchronizing a synchronous replication relationship may be implemented within the clustered network environment 100. In an example, a synchronous replication relationship may be established between the volume 132A of node 116 (e.g., a first storage controller) and the volume 132B of the node 118 (e.g., a second storage controller) in a non-disruptive manner with respect to client data access to the volume 132A and/or the volume 132B. If the volume 132A and the volume 132B become out of sync, then the volume 132A and the volume 132B may be resynchronized in a non-disruptive manner. It may be appreciated that non-disruptively establishing and/or resynchronizing a synchronous replication relationship may be implemented for and/or between any type of computing environment, and may be transferrable between physical devices (e.g., node 116, node 118, etc.) and/or a cloud computing environment (e.g., remote to the clustered network environment 100).

Figure 2:
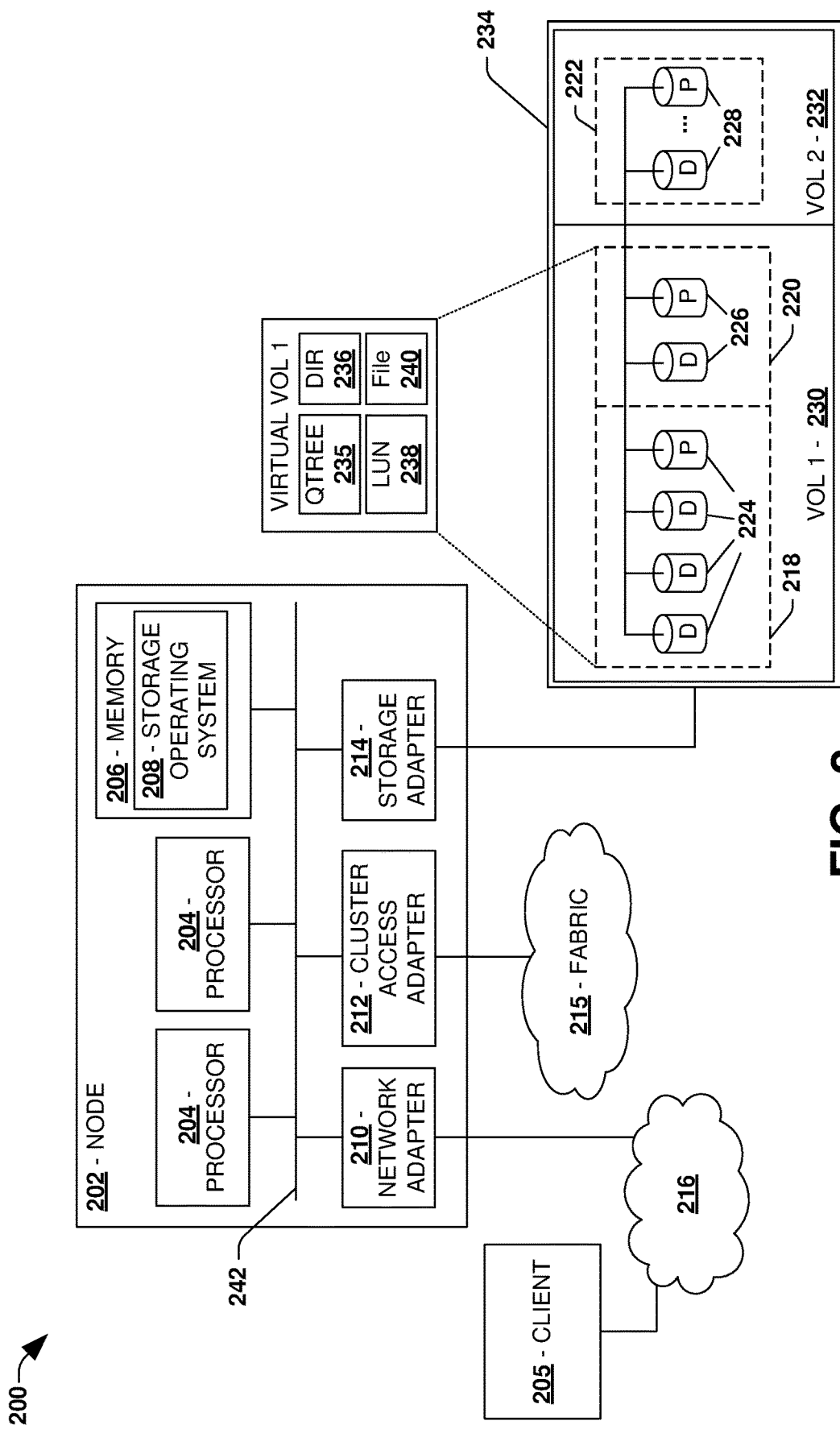
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and network adapters 210, 212, 214 for storing related software application code and data structures. The processors 204 and network adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that non-disruptively establishing and/or resynchronizing a synchronous replication relationship may be implemented for the data storage system 200. In an example, a synchronous replication relationship may be established between the volume 230 of the node 202 (e.g., a first storage controller) and a second volume of a second node (e.g., a second storage controller) in a non-disruptive manner with respect to client data access to the volume 230. If the volume 230 and the second volume become out of sync, then the volume 230 and the second volume may be resynchronized in a non-disruptive manner. It may be appreciated that non-disruptively establishing and/or resynchronizing a synchronous replication relationship may be implemented for and/or between any type of computing environment, and may be transferrable between physical devices (e.g., node 202, host device 205, etc.) and/or a cloud computing environment (e.g., remote to the node 202 and/or the host device 205).

Figure 3:
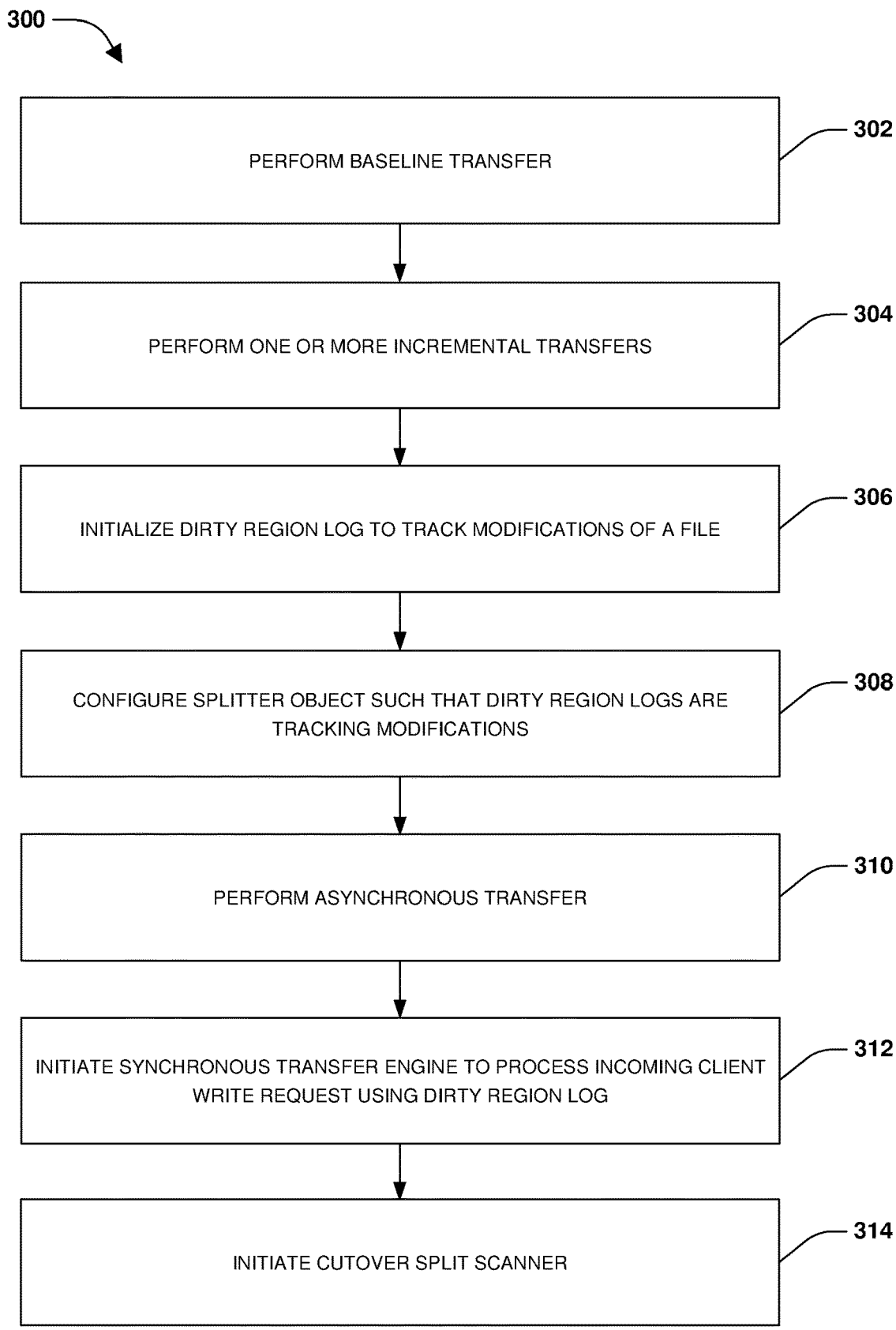
FIG. 3 is a flow chart illustrating an exemplary method of non-disruptively establishing a synchronous replication relationship.

One embodiment of non-disruptively establishing and/or resynchronizing a synchronous replication relationship is illustrated by an exemplary method 300 of FIG. 3. In an example, a synchronous replication relationship may be established between a first storage controller, hosting a primary volume, and a second storage controller. It may be appreciated that the synchronous replication relationship may be established for a file within the primary volume, a LUN within the primary volume, a consistency group of one or more files or LUNs, a consistency group spanning any number of primary volumes, a subdirectory within the primary volume, and/or any other grouping of data, and that the techniques described herein are not limited to merely a single primary volume and secondary volume, but can apply to any number of files, LUNs, volumes, and/or consistency groups. The synchronous replication relationship may be established in a non-disruptive manner such that client access to the primary volume may be facilitated during the establishment of the synchronous replication relationship. Accordingly, a base snapshot, of the primary volume, may be created. The base snapshot may comprise a point in time representation of data within the primary volume, such as data within a consistency group of files and/or storage objects. At 302, a baseline transfer of data from the primary volume to the second storage controller may be performed using the base snapshot to create a secondary volume accessible to the second storage controller.

At 304, one or more incremental transfers may be performed between the primary volume and the secondary volume until a synchronization criteria is met (e.g., and/or other primary volumes and/or secondary volumes where the synchronous replication relationship exists for a consistency group spanning multiple primary volumes). For example, the synchronization criteria may correspond to a threshold number of incremental transfers or where a last incremental transfer transfers an amount of data below a threshold (e.g., about 10 mb or any other value indicative of the primary volume and the secondary volume having a relatively small amount of divergence). In an example, an incremental snapshot of the primary volume may be created. The incremental snapshot may correspond to a point in time representation of data within the primary snapshot at a time subsequent to when the base snapshot was created. A difference between the incremental snapshot and a prior snapshot (e.g., a snapshot used to perform the baseline transfer or a last incremental transfer) of the primary volume may be used to perform an incremental transfer of data (e.g., differences in data within the primary volume from when the prior snapshot was created and when the incremental snapshot was created). For example, a block level incremental transfer, of data blocks that are different between the prior snapshot and the incremental snapshot, may be performed. Responsive to completion of the incremental transfer, a common snapshot may be created from the secondary volume. For example, the common snapshot may be used to roll the secondary volume back to a state when the secondary volume mirrored the primary volume, such as for performing a resynchronization between the primary volume and the secondary volume.

At 306, dirty region logs may be initialized (e.g., in memory) to track modifications of files or LUNs within the primary volume (e.g., and/or other primary volumes where the synchronous replication relationship exists for a consistency group spanning multiple primary volumes) (e.g., track dirty data that has been written to the primary volume but not yet replicated to the secondary volume). For example, a dirty region log for a file or LUN may comprise bits that can be set to indicate whether regions of the file have been modified by client write requests that have not yet been replicated to the secondary volume. For example, a client write request, targeting a region of the file or LUNs, may be received. The client write request may be implemented upon the region (e.g., to write client data into the region). Responsive to successful implementation of the client write request, a bit within the dirty region log may be set to indicate that the region is a dirty region comprising dirty data. The bit may be reset once the client write request and/or the dirty data has been successfully replicated to the secondary volume.

At 308, splitter objects for end points, such as files or LUNs, may be configured to subsequently split client write requests (e.g., at 312) to the primary volume (e.g., and/or other primary volumes and/or secondary volumes where the synchronous replication relationship exists for a consistency group spanning multiple primary volumes) and to the secondary volume (e.g., a splitter object is created and associated with a dirty region log for a file or LUN). For example, a splitter object may be subsequently used to intercept and split a client write request (e.g., before the client write request is received by a file system) into a replication client write request so that the client write request can be locally implemented by the first storage controller upon the primary volume and the replication client write request can be remotely implemented by the second storage controller upon the secondary volume. At this point, the splitter object starts tracking dirty regions using the dirty region logs.

At 310, responsive to the dirty region logs tracking modifications to the primary volume (e.g., marking regions, modified by client write requests, as dirty), an asynchronous transfer from the primary volume to the secondary volume may be performed (e.g., a final incremental transfer).

At 312, a synchronous transfer engine session may be initiated between the primary volume and the secondary volume (e.g., and/or other primary volumes and/or secondary volumes where the synchronous replication relationship exists for a consistency group spanning multiple primary volumes), such that a transfer engine is replicating incoming client write requests to the secondary volume based upon data within the dirty region log. For example, responsive to an incoming client write request targeting a dirty region of the file or LUN within the primary volume (e.g., a bit within the dirty region log may indicate that the dirty region has been modified and that the modification has not yet been replicated to the secondary volume), the incoming client write request may be committed to the primary volume and not split for replication to the secondary volume because the dirty region will be subsequently replicated to the secondary volume by a cutover scanner. Responsive to the incoming client write request corresponding to a non-dirty region, the incoming client write request may be locally committed to the non-dirty region of the primary volume and a replication client write request, split from the incoming client write request, may be remotely committed to the secondary volume. Responsive to the incoming client write request corresponding to a partially dirty region associated with an overlap between a dirty block and a non-dirty block, the incoming client write request may be locally committed to the partially dirty region of the primary volume (e.g., committed to the dirty and non-dirty blocks) and the entire replication client write request may be remotely committed to the secondary volume.

At 314, the cutover scanner may be initiated to scan the dirty region log for transferring dirty data of dirty regions from the primary volume to the secondary volume (e.g., and/or other primary volumes and/or secondary volumes where the synchronous replication relationship exists for a consistency group spanning multiple primary volumes). For example, the cutover scanner may identify a current dirty region of the primary volume using the dirty region log. A lock may be set for the current dirty region to block incoming client write requests to the current dirty region. In an example, while the lock is set, a new incoming client write request, targeting the current dirty region, may be queued. Dirty data of the current dirty region may be transferred to the second storage controller for storage into the secondary volume. The bit, within the dirty region log, may be reset to indicate that the current dirty region is now a clean region with clean data replicated to the secondary volume. Responsive to successful storage of the dirty data into the secondary volume and/or the bit being reset, the current dirty region may be unlocked. Responsive to the current dirty region (e.g., the clean region) being unlocked, the new incoming client write request may be processed (e.g., the clean region may be locked while the new incoming client write request is being implemented upon the clean region, and then the clean region may be unlocked).

Responsive to the cutover scanner completing, the primary volume and the secondary volume may be designated as being in the synchronous replication relationship. While in the synchronous replication relationship, a current client write request to the primary volume may be received. The current client write request may be split into a current replication client write request. The current client write request may be locally committed to the primary storage. The current replication write request may be sent to the second storage controller for remote commitment to the secondary volume. Responsive to the current client write request being locally committed and the current replication client write request being remotely committed, a completion notification may be sent to a client that submitted the current client write request.

In an example, the primary volume and the secondary volume may become out of sync for various reasons, such as network issues, a storage controller failure, etc. Accordingly, a common snapshot between the primary volume and the secondary volume may be used to roll the secondary volume back to a state where the secondary volume mirrored the primary volume. The synchronous replication relationship may be reestablished in a non-disruptive manner (e.g., the primary volume may remain accessible to clients during the resynchronization). For example, the dirty region logs, the splitter objects, the synchronous transfer engine session, and/or the cutover scanner may be used to reestablish the synchronous replication relationship (e.g., at least some of the actions 302, 304, 306, 308, 310, 312, and/or 314 may be performed to reestablish the synchronous replication relationship in a non-disruptive manner).

In an example, the dirty region logs, the splitter objects, the synchronous transfer engine session, and/or the cutover scanner may be used to perform a volume migration operation of the primary volume. For example, the primary volume may be migrated in a non-disruptive manner where a relatively smaller disruption interval is achieved. In this way, client access may be facilitated to the primary volume during the volume migration operation.

In an example, a flip resync may be performed in response to a switchover operation from the first storage controller to the second storage controller (e.g., the first storage controller may fail, and thus the second storage controller may take ownership of storage devices previously owned by the first storage controller, such as a storage device hosting the secondary volume, so that the second storage controller may provide clients with failover access to replicated data from the storage devices such as to the secondary volume). Accordingly, the techniques described in relation to method 300 may be implemented to perform the flip resync to synchronizing data from the secondary volume (e.g., now actively used as a primary by the second storage controller to provide clients with failover access to data) to the primary volume (e.g., now used as a secondary backup volume during the switchover operation).

Figure 4A:
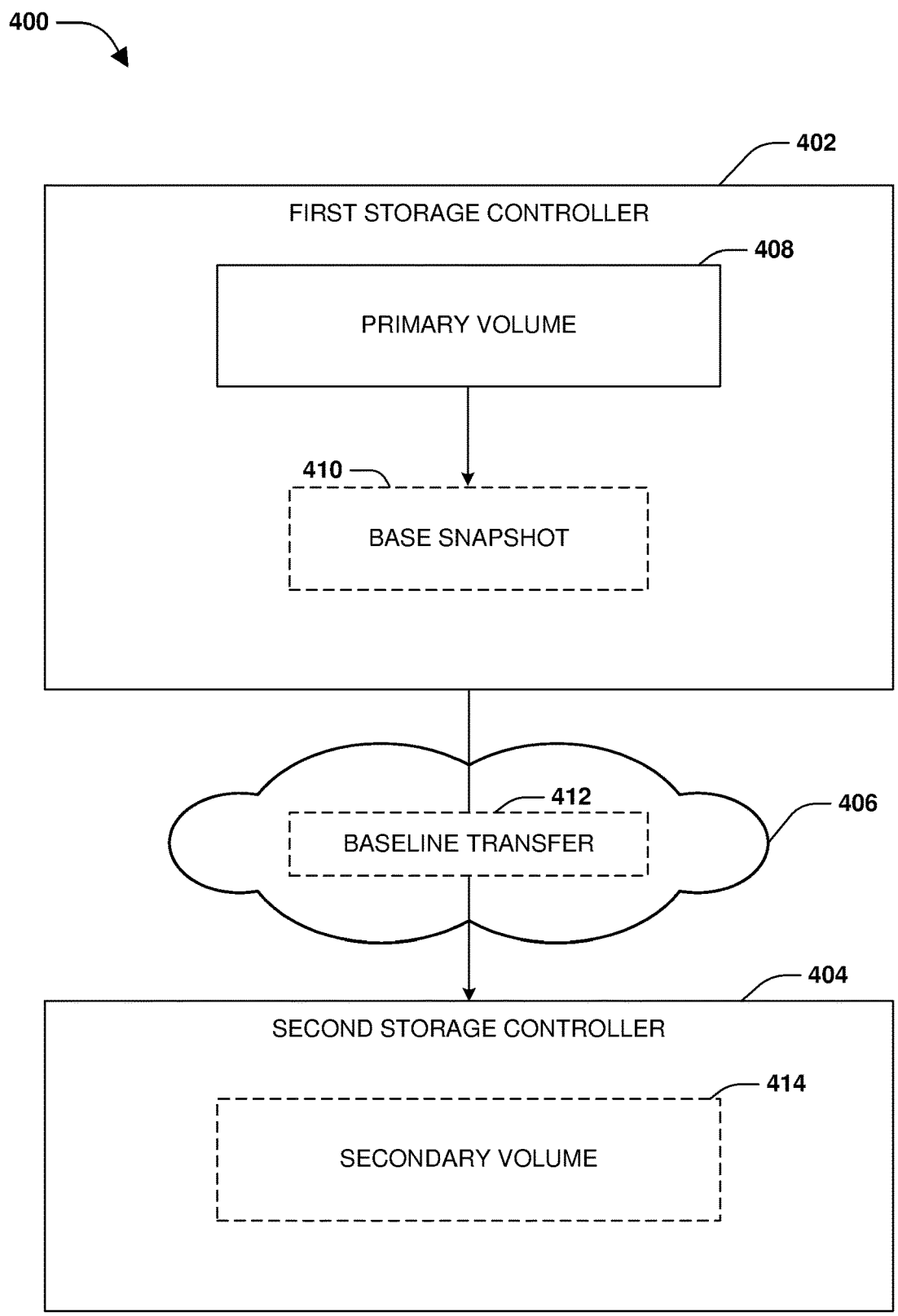
FIG. 4A is a component block diagram illustrating an exemplary computing device for non-disruptively establishing a synchronous replication relationship, where a baseline transfer is performed.

FIGS. 4A-4H illustrate examples of a system for non-disruptively establishing and/or resynchronizing a synchronous replication relationship. FIG. 4A illustrates a first storage controller 402 and a second storage controller 404 having connectivity over a network 406 (e.g., the storage controllers may reside in the same or different clusters). The source storage controller 402 may comprise a primary volume 408 for which a synchronous replication relationship is to be established with the second storage controller 404. Accordingly, a base snapshot 410 of the primary volume 408 or portion thereof (e.g., a snapshot of a consistency group, such as a grouping of files or storage objects) may be created. A baseline transfer 412, using the base snapshot 410, may be performed to transfer data from the primary volume 408 to the second storage controller 404 for creating a secondary volume 414, such that the secondary volume 414 is populated with data mirroring the primary volume 408 as represented by the base snapshot 410.

Figure 4B:
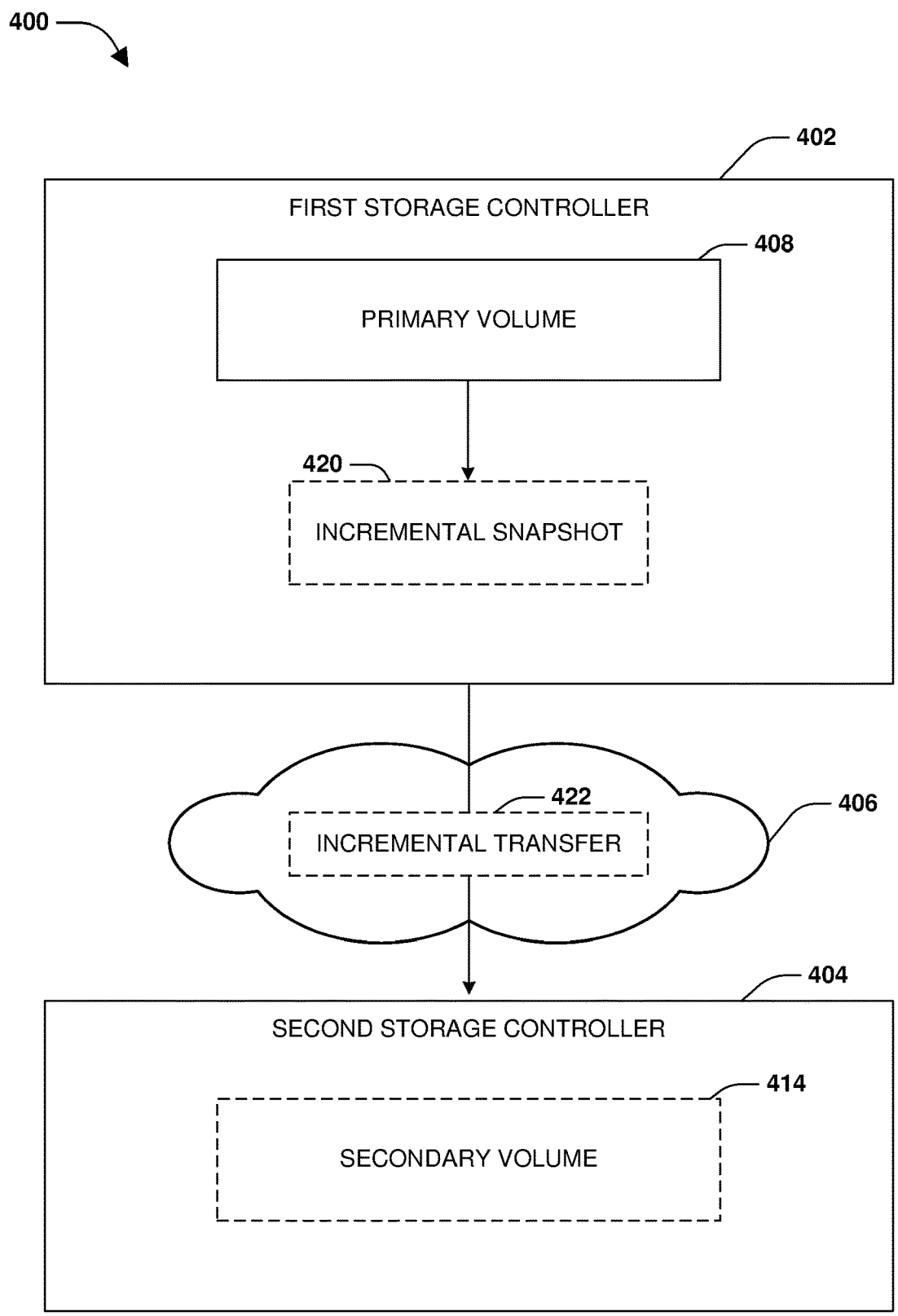
FIG. 4B is a component block diagram illustrating an exemplary computing device for non-disruptively establishing a synchronous replication relationship, where one or more incremental transfers are performed.

FIG. 4B illustrates one or more incremental transfers being performed from the first storage controller 402 to the second storage controller 404. For example, an incremental snapshot 420 of the primary volume 408 may be created. The incremental snapshot 420 may comprise a point in time representation of the primary volume 408 or portion thereof at a subsequent time from when the base snapshot 410 was created. The incremental snapshot 420 and the base snapshot 410 (e.g., or a last incremental snapshot used to perform a most recent incremental transfer) may be compared to identify differences of the primary volume 408 from when the incremental snapshot 420 was created and when last snapshot, such as the base snapshot 410, was created and transferred/replicated to the secondary volume 414 (e.g., files, directories, and/or hard links may be created, deleted, and/or moved within the primary volume 408, thus causing a divergence between the primary volume 408 and the secondary volume 414). In an example, data differences may be transferred using the incremental transfer 422. In another example, storage operations, corresponding to the differences (e.g., a create new file operation, a delete file operation, a move file operation, a create new directory operation, a delete directory operation, a move directory operation, and/or other operations that may be used by the second storage controller 404 to modify the secondary volume 414 to mirror the primary volume 408 as represented by the incremental snapshot 420), may be transferred to the second storage controller 404 using the incremental transfer 422 for implementation upon the secondary volume 414. In this way, files, directories, hard links, and/or data within the secondary volume 414 may mirror the primary volume 408 as represented by the incremental snapshot 420. Incremental transfers, using incremental snapshots, may be performed until a synchronization criteria is met (e.g., a threshold number of incremental transfers, a last transfer transferring an amount of data below a threshold, etc.).

Figure 4C:
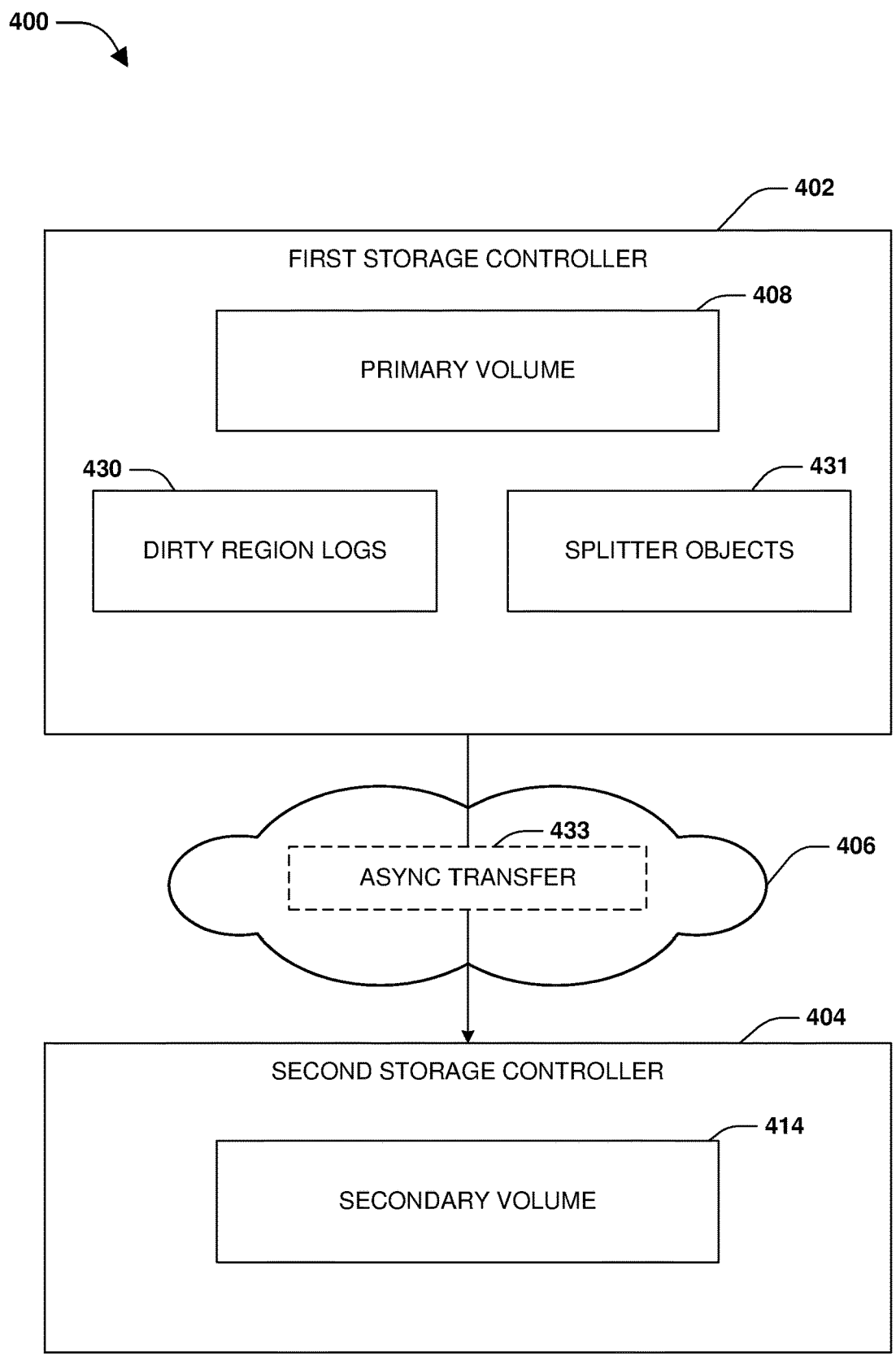
FIG. 4C is a component block diagram illustrating an exemplary computing device for non-disruptively establishing a synchronous replication relationship, where dirty region logs and splitter objects are established.

FIG. 4C illustrates dirty region logs 430 being initialized for tracking modifications of files or LUNs within the primary volume 408. For example, a dirty region log may comprise bits that may be set to indicate whether regions of a file or LUN have been modified by client write requests that have not been replicated to the secondary volume 414 and thus are dirty regions, or whether regions are synchronized with the same data between the primary volume 408 and the secondary volume 414 and thus are clean regions. Splitter objects 431, for endpoints such as the second storage controller 404 or other storage controllers, may be configured to split client write requests to the primary volume 408 and to the secondary volume 414. Responsive to the dirty region logs 430 tracking modifications, an asynchronous transfer 433 of data from the primary volume 408 to the secondary volume 414 may be performed (e.g., a final incremental transfer).

Figure 4D:
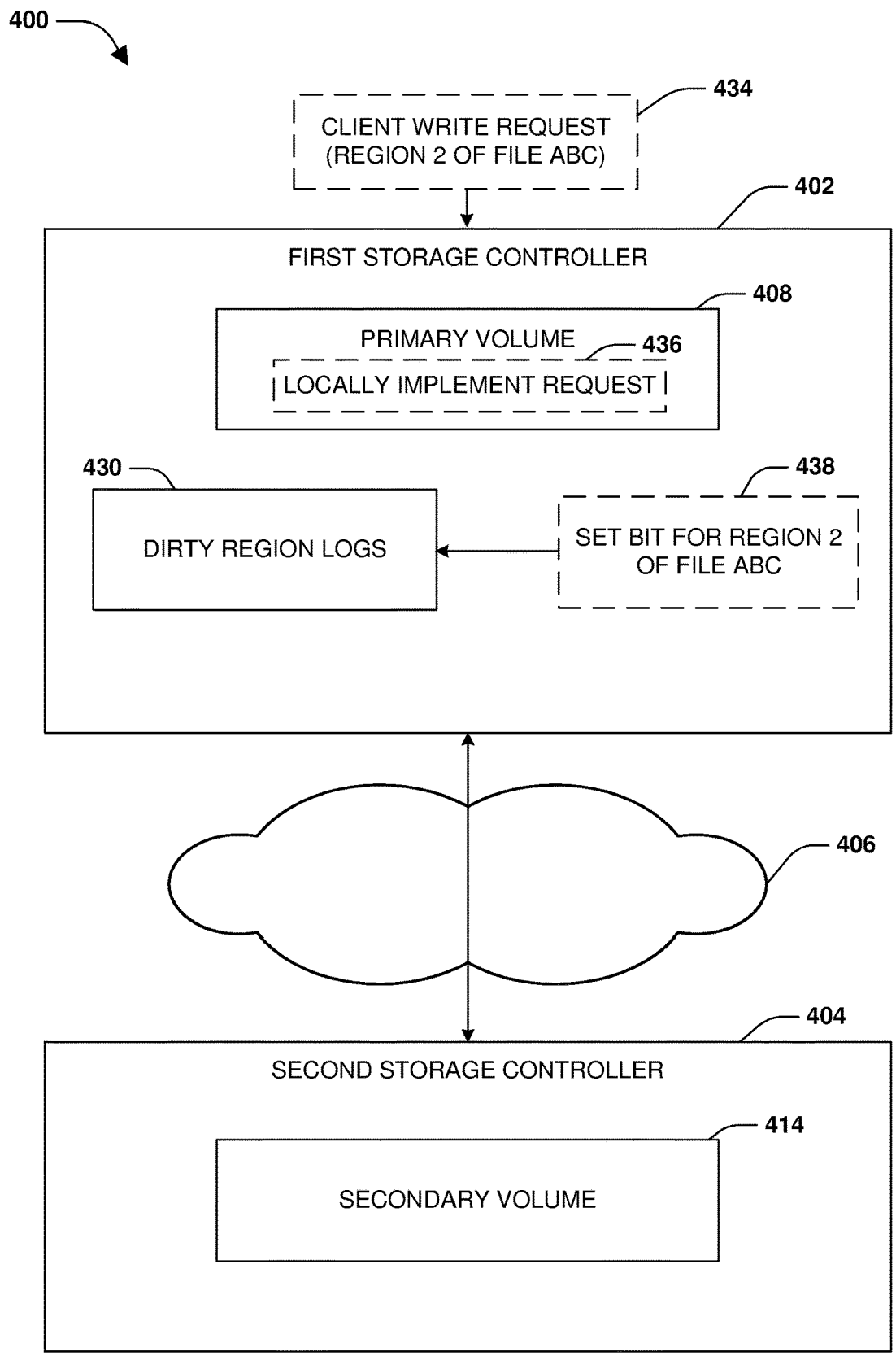
FIG. 4D is a component block diagram illustrating an exemplary computing device for non-disruptively establishing a synchronous replication relationship, where a client write request is processed.

FIG. 4D illustrates the dirty region logs 430 being used to track modifications by client write requests to the primary volume 408. For example, the first storage controller 402 may receive a client write request 434 targeting a second region within a file ABC. The client write request 434 may be locally implemented 436 upon the primary volume 408. Accordingly, a bit, corresponding to the second region of the file ABC, may be set to indicate that the second region is a dirty region because the modification of the client write request 434 has not yet been replicated to the secondary volume 414.

Figure 4E:
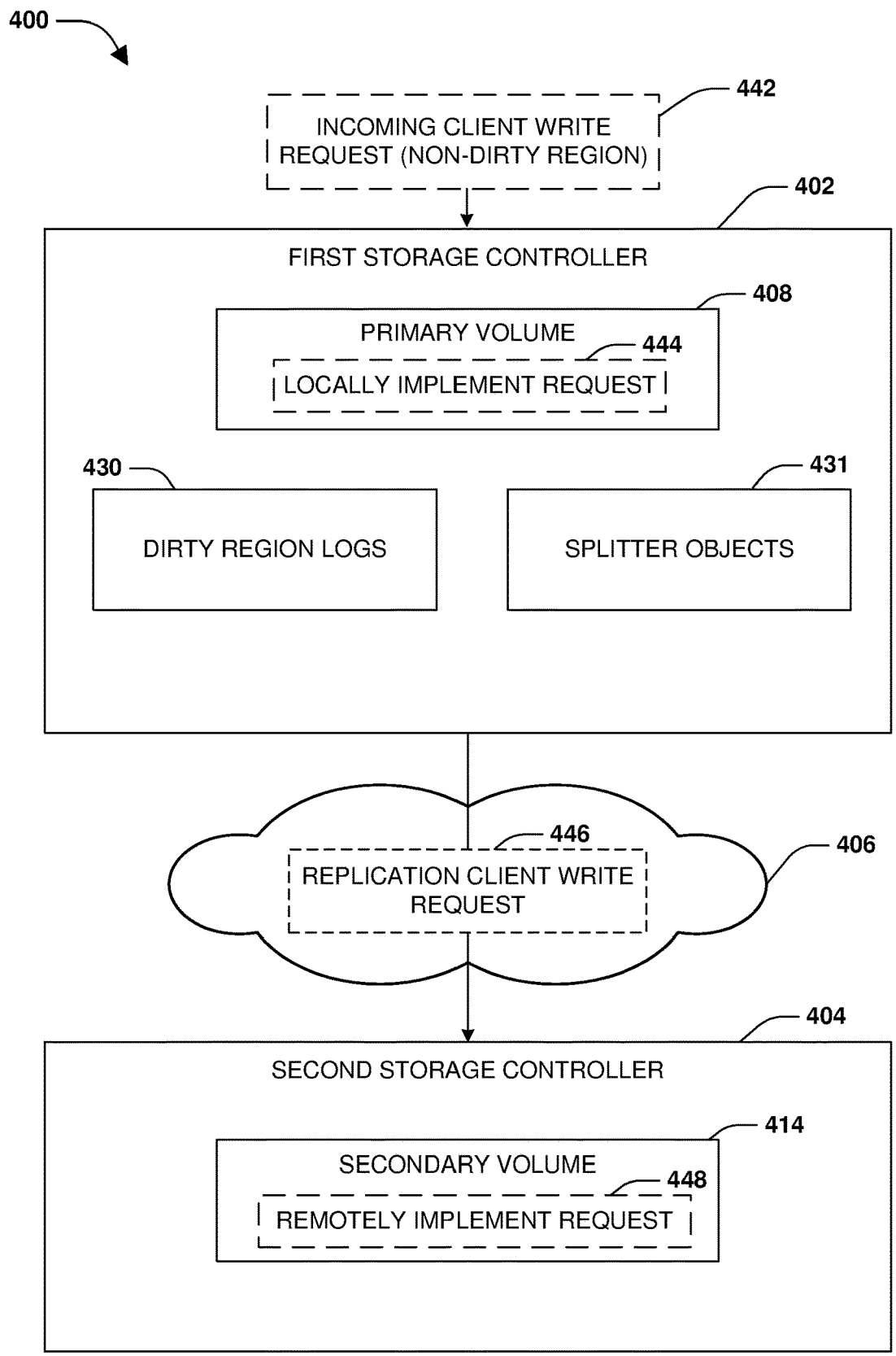
FIG. 4E is a component block diagram illustrating an exemplary computing device for non-disruptively establishing a synchronous replication relationship, where an incoming client write request is processed.

FIG. 4E illustrates the splitter objects 431 performing client write request splitting. In an example, a synchronous transfer engine session may be initiated to use the dirty region logs 430 and/or the splitter objects 431 to process incoming client write requests. For example, an incoming client write request 442 may be received by the first storage controller 402. The dirty region logs 430 may be evaluated to determine that the incoming client write request 442 targets a non-dirty region within the primary volume 408. Accordingly, the incoming client write request 442 may be locally implemented 444 upon the primary volume 408. The incoming client write request 442 may be split by the splitter objects 431 into a replication client write request 446 that is sent to the second storage controller 404 for remote implementation 448 upon the secondary volume 414. In another example, a second incoming client write request, not illustrated, may be received by the first storage controller 402. The second incoming client write request may correspond to a partially dirty region that is associated with an overlap between one or more dirty blocks and one or more non-dirty blocks of the primary volume 408. Accordingly, the first storage controller 402 may locally commit the entire second incoming client write request to the primary volume 408, and the entire second incoming client write request may be replicated to the secondary volume 414.

Figure 4F:
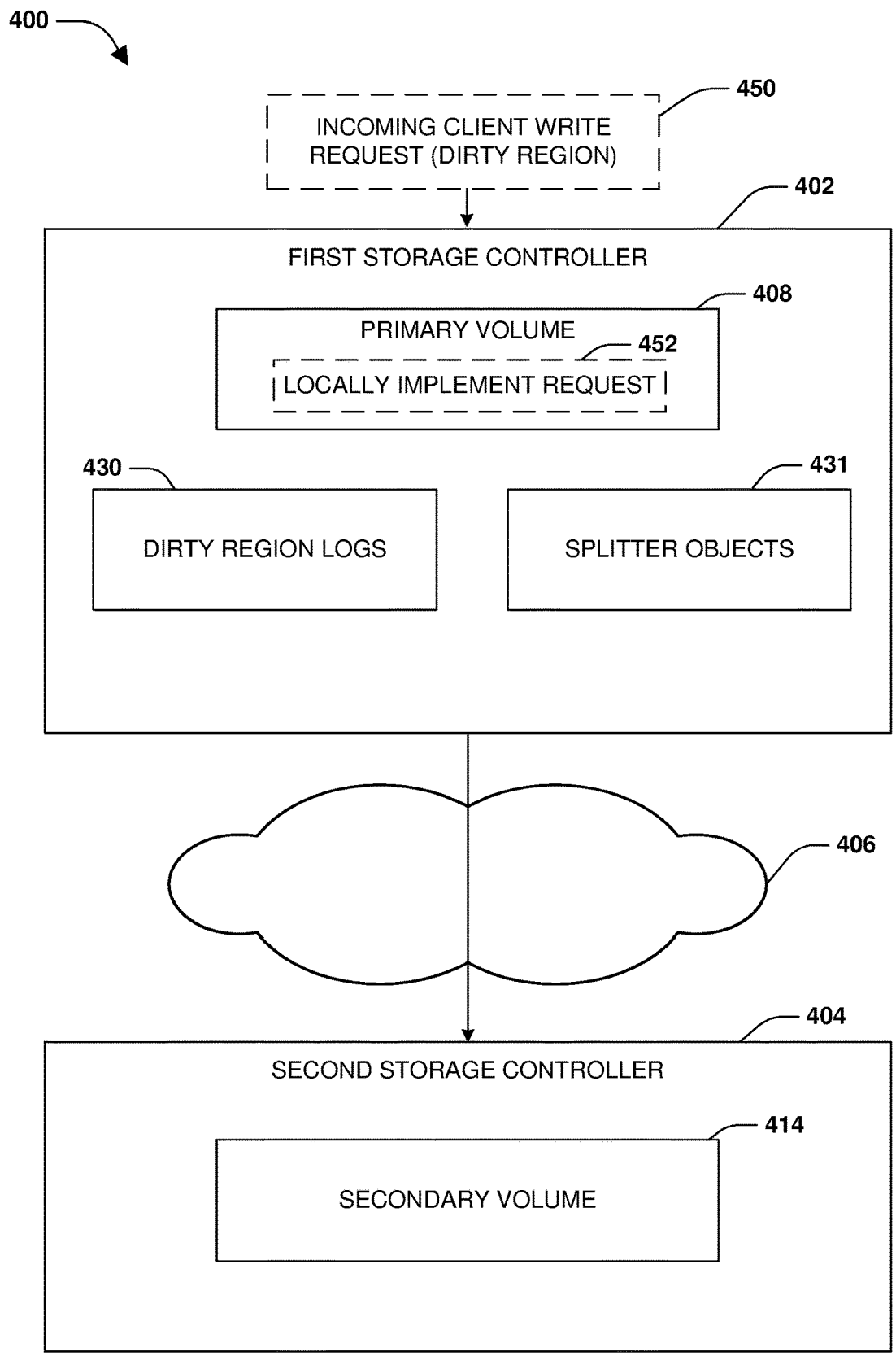
FIG. 4F is a component block diagram illustrating an exemplary computing device for non-disruptively establishing a synchronous replication relationship, where an incoming client write request is processed.

FIG. 4F illustrates the splitter objects 431 performing client write request splitting. For example, an incoming client write request 450 may be received by the first storage controller 402. The dirty region logs 430 may be evaluated to determine that the incoming client write request 450 targets a dirty region within the primary volume 408. Accordingly, the incoming client write request 450 may be locally implemented 452 upon the primary volume 408, but not replicated to the secondary volume 414 because a cutover scanner may subsequently replicated dirty data within the dirty region to the secondary volume 414.

Figure 4G:
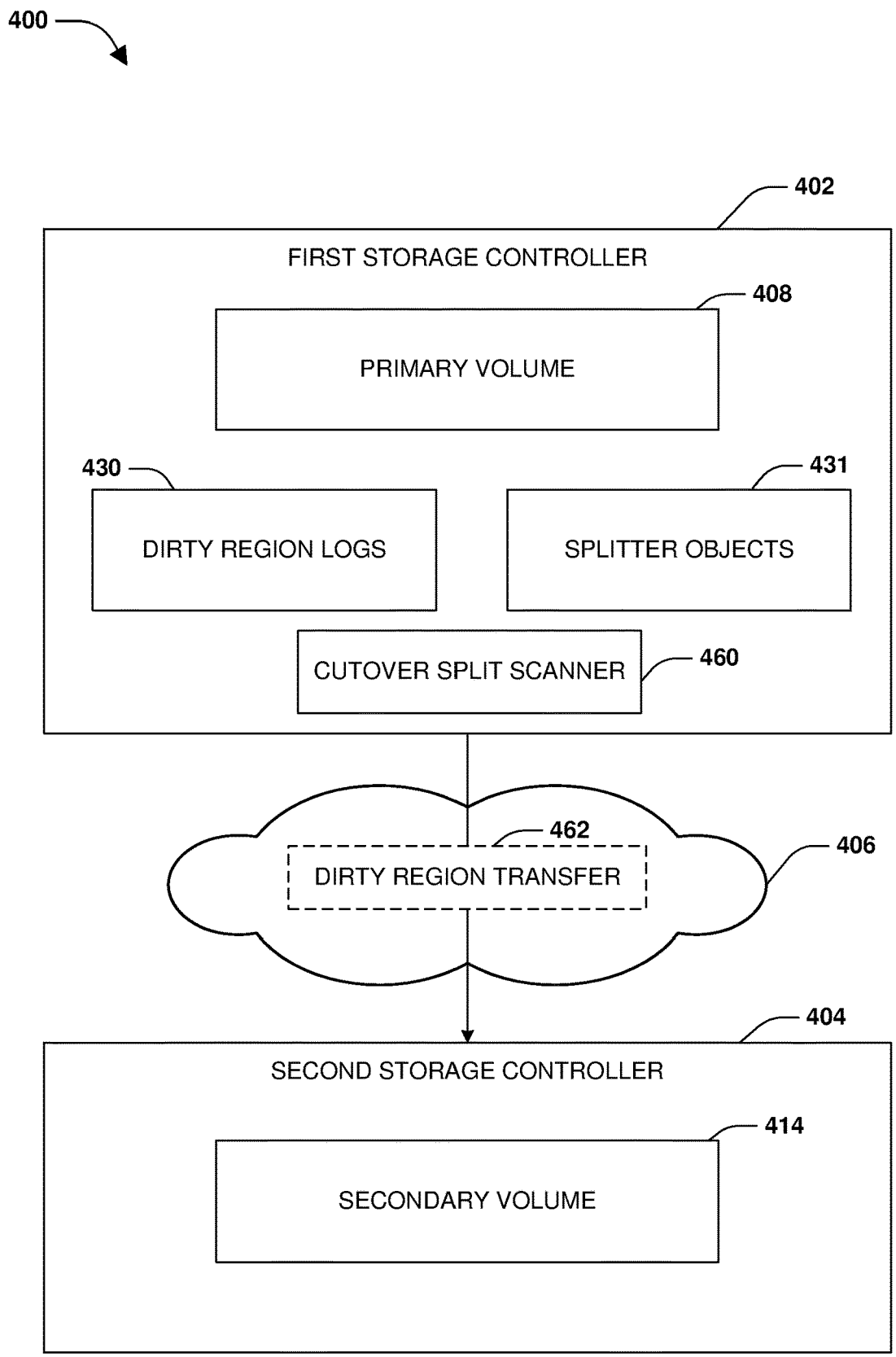
FIG. 4G is a component block diagram illustrating an exemplary computing device for non-disruptively establishing a synchronous replication relationship, where a cutover scanner performs a dirty region transfer.
Figure 4H:
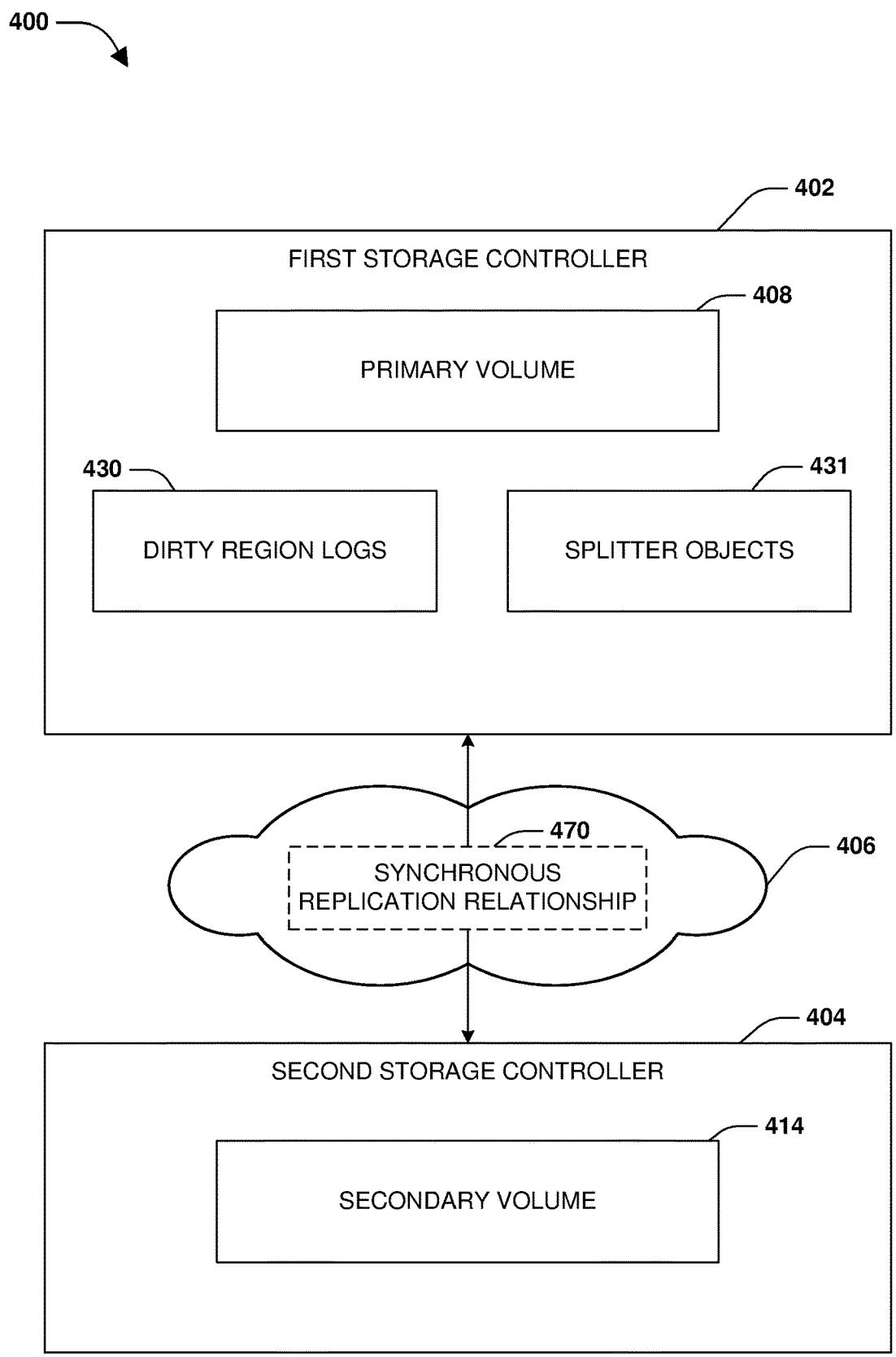
FIG. 4H is a component block diagram illustrating an exemplary computing device for non-disruptively establishing a synchronous replication relationship, where a synchronous replication relationship is established.

FIG. 4G illustrates the cutover scanner 460 being initiated to scan the dirty region logs 430 for transferring dirty data of dirty regions from the primary volume 408 to the secondary volume 414. For example, the cutover scanner 460 may scan the dirty region logs 430 to determine that the second region of file ABC is a dirty region. Accordingly, dirty data within the dirty region is replicated to the secondary volume 414 using a dirty region transfer 462, and the dirty region logs 430 are modified to indicate that the second region is now clean. In this way, the cutover scanner 460 replicates dirty data to the secondary volume 414 so that the secondary volume 414 mirrors the primary volume 408 (e.g., to reduce or eliminate data divergence between the primary volume 408 and the secondary volume 414 in order to bring the primary volume 408 and the secondary volume 414 into sync). Additionally, the splitter objects 431 are splitting and replicating incoming client write requests to the primary volume 408 and the secondary volume 414, which can also reduce or eliminate data divergence in order to bring the primary volume 408 and the secondary volume 414 into sync. Thus, once the cutover scanner 460 is complete, the primary volume 408 and the secondary volume 414 are designated as being in a synchronous replication relationship 470 where data consistency is maintained between the primary volume 408 and the secondary volume 414 (e.g., client write requests are committed to both the primary volume 408 and the secondary volume 414 before client requests are responded back to clients as being complete), as illustrated in FIG. 4H.

In an example, the primary volume 408 and the secondary volume 414 may become out of sync for various reasons, such as network issues, a storage controller failure, etc. Accordingly, a common snapshot between the primary volume 408 and the secondary volume 414 may be used to roll the secondary volume 414 back to a state where the secondary volume 414 mirrored the primary volume 408. Once the secondary volume 414 has been rolled back, the synchronous replication relationship 470 may be reestablished using the techniques described above (e.g., method 300 of FIG. 3 and/or FIGS. 4A-4G) that were used to initially establish the synchronous replication relationship 470. For example, the dirty region logs 430, the splitter objects 431, the synchronous transfer engine session, and/or the cutover scanner 460 may be used to reestablish the synchronous replication relationship 470.

In an example, the dirty region logs 430, the splitter objects 431, the synchronous transfer engine session, and/or the cutover scanner 460 may be used to perform a volume migration operation of the primary volume 408. For example, the primary volume 408 may be migrated in a non-disruptive manner where a relatively smaller disruption interval is achieved. In this way, client access may be facilitated to the primary volume 408 during the volume migration operations.

Figure 5:
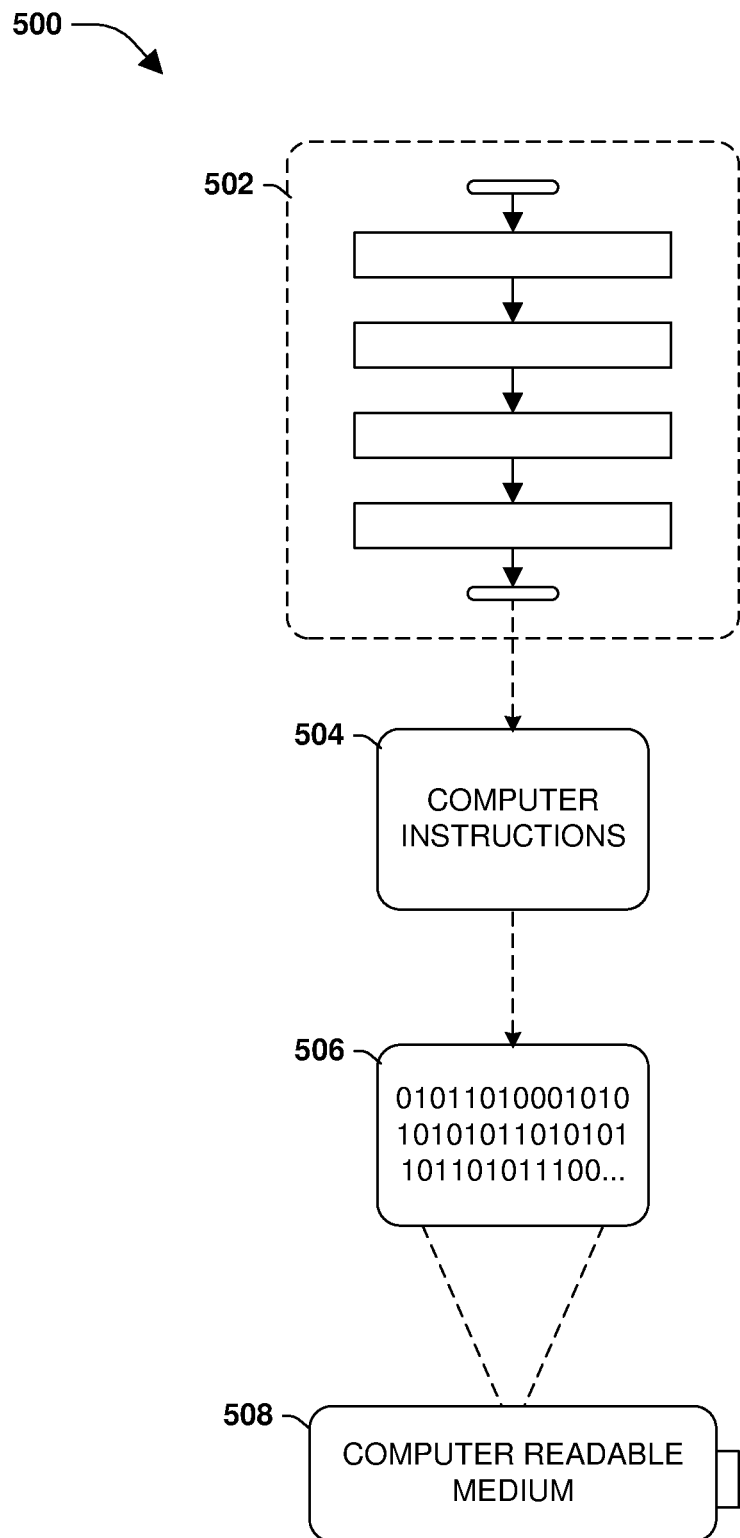
FIG. 5 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 5, wherein the implementation 500 comprises a computer-readable medium 508, such as a CD-ft DVD-R, flash drive, a platter of a hard disk drive, etc., on which is encoded computer-readable data 506. This computer-readable data 506, such as binary data comprising at least one of a zero or a one, in turn comprises a processor-executable computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable computer instructions 504 are configured to implement a system, such as at least some of the exemplary system 400 of FIGS. 4A-4H, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
performing incremental transfers of data from a primary volume to a secondary volume using incremental snapshots;
executing write requests to the primary volume and the secondary volume;
performing an asynchronous transfer of data from the primary volume to the secondary volume based upon a dirty region log being used to track dirty regions modified by write requests; and
committing incoming write requests corresponding to the dirty regions to the primary volume and incoming write requests corresponding to non-dirty regions to the primary volume and the secondary volume to place the primary volume and secondary volume into a synchronous replication state.

2. The method of claim 1, wherein the incremental transfers are performed until a criteria is met, and the method comprising:
determining that the criteria is met based upon a threshold number of incremental transfers completing.

3. The method of claim 1, wherein the incremental transfers are performed until a criteria is met, and the method comprising:
determining that the criteria is met based upon a last incremental transfer transferring an amount of data below a threshold.

4. The method of claim 1, wherein the performing incremental transfers comprises:
performing a block level incremental transfer of data blocks that are different between a prior snapshot and an incremental snapshot.

5. The method of claim 1, wherein the performing incremental transfers comprises:
creating a common snapshot from the secondary volume based upon an incremental transfer completing.

6. The method of claim 1, comprising:
scanning the dirty region log to identify and transfer data of the dirty regions from the primary volume to the secondary volume to place the primary volume and secondary volume into the synchronous replication state.

7. The method of claim 1, wherein a base snapshot used to perform a baseline transfer of data from the primary volume to the secondary volume and an incremental snapshot correspond to a consistency group.

8. The method of claim 6, wherein the scanning comprises:

locking a dirty region of the primary volume to block incoming write requests to the dirty region until data of the dirty region has successfully been transferred to the secondary volume.

9. The method of claim 8, comprising:
queuing incoming write requests that target the dirty region based upon the dirty region being locked.

10. The method of claim 9, comprising:
processing the incoming write request based upon the dirty region being unlocked.

11. The method of claim 1, comprising:
committing an incoming write request to the primary volume and the secondary volume based upon the incoming client write request corresponding to a partially dirty region associated with an overlap between a dirty block and a non-dirty block.

12. The method of claim 1, comprising:
modifying the secondary volume to corresponds to a common snapshot between the primary volume and the secondary volume based upon a determination that the primary volume and the secondary volume are out of sync.

13. The method of claim 1, comprising:
synchronously executing write requests upon the primary volume and the secondary volume before sending completion notification to clients that submitted the write requests based upon the primary volume and secondary volume being in the synchronous replication state.

14. The method of claim 1, wherein the tracking modifications comprises:
setting a bit within the dirty region log to indicate that a region is a dirty region based upon a write request being executed upon the region.

15. The method of claim 1, comprising:
facilitating client access to the primary volume during establishment of the synchronous replication state between the primary volume and the secondary volume.

16. The method of claim 1, comprising:
performing a volume migration operation for the primary volume.

17. The method of claim 16, comprising:
facilitating client access to the primary volume during the volume migration operation.

18. A non-transitory machine readable medium having stored thereon instructions, which when executed by a machine, causes the machine to:
perform incremental transfers of data from a primary volume to a secondary volume using incremental snapshots;
execute write requests to the primary volume and the secondary volume;
perform an asynchronous transfer of data from the primary volume to the secondary volume based upon a dirty region log being used to track dirty regions modified by write requests; and
commit incoming write requests corresponding to the dirty regions to the primary volume and incoming write requests corresponding to non-dirty regions to the primary volume and the secondary volume to place the primary volume and secondary volume into a synchronous replication state.

19. A computing device comprising:
a memory having stored thereon instructions for performing a method; and a processor coupled to the memory, the processor configured to execute the instructions to cause the processor to:
  perform incremental transfers of data from a primary volume to a secondary volume using incremental snapshots;
  execute write requests to the primary volume and the secondary volume;
  perform an asynchronous transfer of data from the primary volume to the secondary volume based upon a dirty region log being used to track dirty regions modified by write requests; and
  commit incoming write requests corresponding to the dirty regions to the primary volume and incoming write requests corresponding to non-dirty regions to the primary volume and the secondary volume to place the primary volume and secondary volume into a synchronous replication state.

20. The computing device of claim 19, wherein the incremental transfers are performed until a criteria is met, and wherein the instructions cause the processor to:
  determine that the criteria is met based upon a threshold number of incremental transfers completing.

* * * * *